United States Patent Office 3,219,307
Patented Nov. 23, 1965

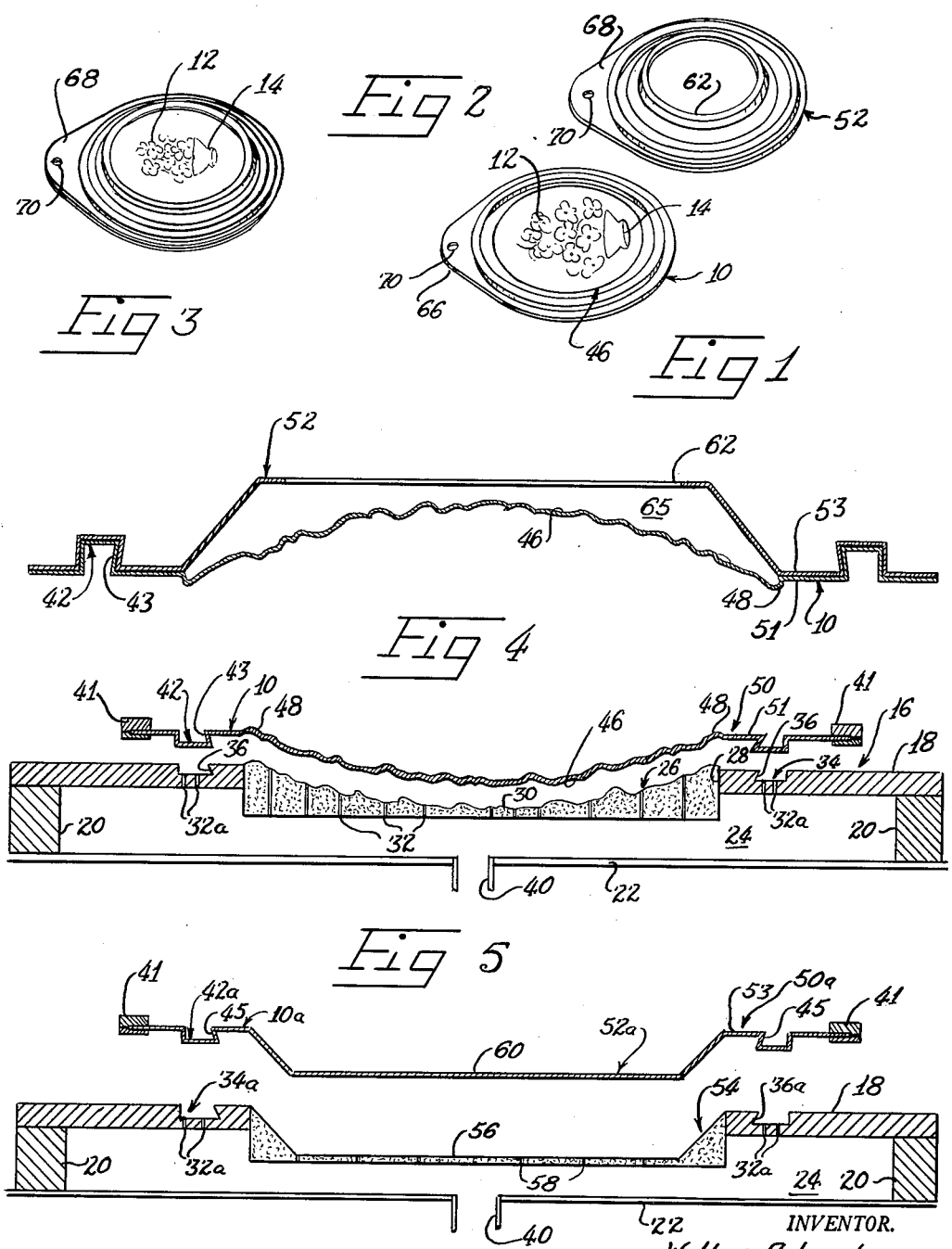

3,219,307
MULTI-PART MOLD
Walter A. Leeds, Niles, and Norbert J. Sweete, Chicago, Ill., assignors to Leeds Sweete Products, Inc., Chicago, Ill., a corporation of Illinois
Filed Sept. 20, 1961, Ser. No. 139,542
3 Claims. (Cl. 249—168)

This invention relates to a novel thermoplastic mold construction, and more particularly pertains to multi-part molds particularly adapted for individual use in the casting of plaster objects by the hobbyist.

In the casting of objects from ceramic compositions, plaster and the like, difficulty is frequently experienced in fitting together multi-part mold pieces. Such difficulties may result in defects of varying kinds in the final cast object. For example, excessive flash occurring at mold joints must be removed if an attractive appearance of the final cast object is to be attained. Flash removal is quite often time-consuming and expensive, and may provide a major factor contributing to inefficiency of a casting operation.

Molds employed in the commercial manufacture of plaster objects are expensive and precision made. The manufacture of cast products requiring no finishing operations necessitates the utilization of expensive handmade molds composed of metal alloys or other durable materials which possess a long working life.

The individual hobbyist has been unable to obtain inexpensive multi-part molds which consistently produce castings requiring little finishing operations. Massive molds of the type used commercially are prohibitively expensive. Attempts to form inexpensive thermoplastic sheet mold portions for hobby use within desired size tolerances have been unsuccessful heretofore in that mating mold parts intended to be assembled together for purposes of forming a desired article cavity would not fit together properly.

In the forming of shapes from thermoplastic sheet materials a heated sheet of thermoplastic, which is form-retaining when at room temperature, is heated until plastic, after which it is urged by positive air pressure or vacuum against a die surface. The deformed thermoplastic sheet is cooled while in the deformed state so that the impression imparted thereto by the die is retained.

It is an object of this invention to provide a novel, inexpensive, multi-part mold construction formed from thermoplastic materials by vacuum-forming or pressure-forming.

It is a further object of the invention to provide a multi-part mold of thermoplastic material which employs a novel interlock substantially eliminating flash in the cast objects, conceals the joint of the two mold portions, and guards against mold part separation during normal use.

It is another object of this invention to provide a multi-part mold of thermoplastic material adapted for the formation of plates and like objects, which is so constructed that any flash which may be formed indicating the juncture of individual mold pieces is so located as to be hidden from view in the normal course of plate use.

It is a still further object of this invention to provide a novel, inexpensive, mold construction for individual use by the hobbyist which may readily be manufactured in a minimum of time.

It is another object to form a multi-part thermoplastic sheet mold which, despite its thinness, is substantially distortion-free and provides excellent reproducibility of a die surface.

The above and other objects of this invention will become more apparent from the following detailed discussion when read in the light of the accompaning drawing and appended claims.

In one embodiment of this invention a thin, heated sheet of thermoplastic material, such as a butyrate plastic, is vacuum formed by being urged by atmospheric pressure against a die surface. The die surface is relieved to define a main central figure surrounded by a planar surface portion having a channel-like, continuous recess formed therein. The thermoplastic sheet, on cooling, comprises a rigid mold possessing a main central figure, which may define a decorative plate face or the like, surrounded by a planar perimetric portion. The planar perimetric portion has a channel-like recess formed therein, which is partly undercut.

A second thin, heated, thermoplastic sheet of the same physical characteristics as the first may be concomitantly vacuum formed over a second relieved die surface. A channel-containing planar surface portion substantially the same as that formed in the plastic sheet above described surrounds the die-formed surface. The second plastic sheet is deformed so as to define a shell or cavity of an article to be cast when disposed in nested relationship with said first sheet.

The two thin sheets when thus formed, trimmed and assembled, constitute a unique, simple, flexible two-part mold with an invisible parting line and intricate molding detail. The molds may be interlocked in their nested relationship by means of the channel-like recesses whereby the perimetric planar surface portions are tightly urged together. The interlocked thermoplastic molds may be placed with the face mold lowermost and a liquid suspension of hardenable material, such as plaster of Paris, is poured into the cavity defined by said molds through an opening in the uppermost mold member.

For a more complete understanding of this invention, reference will now be made to the drawing in which:

FIGURE 1 is a perspective view of a front or face mold portion for a decorative plate made in accordance with the teaching of this invention;

FIG. 2 is a perspective view of a wall-defining plate mold portion made in accordance with the teaching of this invention;

FIG. 3 is a perspective view illustrating the mold components of FIGS. 1 and 2 in assembled relationship ready for casting;

FIG. 4 is an enlarged sectional view taken on line 4—4 of FIG. 3;

FIG. 5 is an enlarged sectional view illustrating the front mold portion of FIG. 1 in spaced relationship with a die-vacuum box assembly employed in the course of forming the same; and FIG. 6 is an enlarged sectional view illustrating the wall mold portion of FIG. 2 in spaced relationship with a die-vacuum box assembly employed in the course of forming the same.

Referring now more particularly to FIGS. 1 through 3, mold portions formed from thermoplastic sheet material are therein illustrated. In FIG. 1, a front or face mold 10 is illustrated having a convex intagliated working surface 46, seen in cross section in FIG. 4, which is adapted to form a corresponding concave surface of a plate or like article. As an example, intagliated portions of the illustrated mold member 10 define an assembly of flowers 12 disposed in a bowl member 14.

The face mold 10 may be formed from a thin sheet of butyrate plastic or other suitable thermoplastic material by means of vacuum box assembly 16 as illustrated in FIG. 5. Assembly 16 comprises a platen face 18 mounted on opposed supports 20, which cooperate with floor 22 for purposes of forming a vacuum chamber 24. The platen face 18 is adapted to receive and supportably engage a number of dies, such as die 26, illustrated in engagement with inner annular surface 28 of platen face 18. The die 26 may be locked in place by any conventional clamp or attachment. Die 26 has a concave surface 30 which is intagliated so as to define a design such as the flowers 12 and flower holder 14, more clearly seen in the mold 10 illustrated in FIGS. 1 and 3. A plurality of spaced vacuum relief passageways 32 traverse the thickness of die 26.

Uniformly disposed in the surface of platen face 18 relative to annular surface 28 is a channed-like recess 34 which, as noted from FIG. 5 may be of rectilinear cross-sectional configuration. Vacuum relief passageways 32a traverse the platen face portion underlying recess 34. Particular note should be given to the angularly inclined wall portion 36 defining, in part, the cross section of recess 34. The latter wall portion is angularly inclined downwardly and inwardly toward the centrally disposed die 26. The angular inclination provides an undercut for purposes which will hereinafter be made apparent.

The angular inclination of wall 36, for purposes of this invention, need only be very slight; for instance, an inclination of two degrees from the vertical is satisfactory. The illustrated angular inclination of the drawing is in excess of that necessary, but is so illustrated for facilitating understanding of this invention.

In normal formation of face mold 10, illustrated in FIG. 1, a piece of thermoplastic material is heated until plastic and lowered by means of a clamping frame 41, or the like, into engagement with face die 26. The sheet should be of sufficient area to engage portions of platen face 18 surrounding die 26, at least to an extent extending outwardly beyond the annular channel-like recess 34. After the plastic sheet engages die 26 and platen face 18, atmosphere is withdrawn from between the thermoplastic sheet and die 26 and the platen face portions disposed beneath recess 34 in accordance with known vacuum-forming procedures by means of a vacuum pump (not illustrated).

The withdrawn atmosphere proceeds through air passageways 32 and 32a into vacuum chamber 24, from which it exits by means of vacuum port 40 formed in chamber floor 22 which is in turn connected to the vacuum pump. To facilitate evacuation and increase the vacuum-forming efficiency, the joints between chamber floor 22 and supports 20 and between the supports and platen face 18 and between the platen face and die 26 should be fluid tight so that all air may exit uniformly. The uniform evacuation of the entrapped air will assure uniformity of formation of the heated plastic sheet on the engaged die and platen face surfaces.

The deformed plastic sheet defining face mold 10 is allowed to cool until it assumes a rigid condition, so as to retain the deformation imparted thereto by die 26 and platen face 18. Although the surface 36 is inwardly and downwardly inclined, channel-like recess 42 perimetrically formed in the mold 10 about face 46 may be readily withdrawn from the die platen recess because of the flexible nature of the butyrate plastic and the relatively slight undercut. A number of other well-known thermoplastic materials, such as acetates and polystyrenes, possess similar properties of flexibility at room temperature and may be used in the practice of the instant invention. In one preferred embodiment of the invention a cellulose acetate butyrate sheet having a thickness of .020 inch has proven very satisfactory, having sufficient body to be self-sustaining, while sufficiently flexible to be readily assembled and manipulated. The thickness employed will of course depend in part upon the plasticity of the material and can vary.

It will be seen from FIG. 5 that the uppermost peripheral portions of die 26 are convex and disposed above the plane of platen face 18. Accordingly, the outer periphery of the concave face 46 of face mold 10 will be raised, as indicated by ridge 48 in FIG. 5, above the plane of annular planar portion 50 of the mold having channel-like recess 42 formed therein.

Mold face 10 is adapted to engage in interlocking relationship a side wall-defining plate mold 52, more clearly seen in FIG. 2. Mold 52 is vacuum formed from a sheet of thermoplastic material, such as a butyrate plastic, in substantially the same manner as that above-described relative to the face mold 10.

FIG. 6 illustrates an assembly in which a die 54 designed to form the side wall mold portion 52 is illustrated in assembled relationship with platen face 18 and other vacuum box components described with respect to FIG. 5. Die 54 has a dished forming surface 56 having a plurality of air passageways 58 traversing the same. It is one important feature of the method of this invention that the thermoplastic side wall mold 52 is formed from the same piece of thermoplastic sheet material from which face mold 10 is formed, and is preferably vacuum formed at the same instant with the face mold under identical conditions of temperature, vacuum, etc. As a result of employing the same plastic material and the same physical conditions in the formation of mold portions 10 and 52, problems of different coefficients of expansion and shrinkage in the two mold portions in the normal course of use thereof occasioned by varying thicknesses of material or resulting from vacuum forming under varying conditions of temperature and vacuum are minimized.

Because of the differences in the depths to which portions of the heated thermoplastic sheets must be drawn to the concave surfaces of the dies 26 and 54, the butyrate sheet portions vacuum formed into the molds 10 and 52 may be drawn to slightly different thicknesses. However, in vacuum forming, difficulty resulting from excessive thinning of thermoplastic material by being drawn into a cavity is obviated if the diameter of any opening is no less than twice the depth of the opening.

The central portion of the bottom surface 60 formed as a result of vacuum-formed thermoplastic sheet 52a engaging the lower planar surface portion 56 of die 54, illustrated in FIG. 6, may be removed by a simple die cutting operation so as to form mold 52 having annular opening 62, more clearly seen in FIG. 2. Also the periphery of mold parts 10 and 12 are trimmed by the cutting dies at the same time to define a convenient and aesthetic outer periphery and an aperture 70 for hanging the mold when it is not in use.

In normal use, face mold 10 is disposed with the channel-like recess 42 and face surface 46 disposed upwardly in the manner illustrated in FIGS. 3 and 4. Plate wall-defining mold 52 is then nested atop the underlying face mold 10 in the manner illustrated in FIG. 4, with the two channel portions 42 and 42a in interlocking relationship.

To facilitate the interlocking relationship of the mold parts annular locking channel recess 34a in platen 18, illustrated in FIG. 6, may be formed with slightly larger dimensions than recess 34 in FIG. 5 so that mold channel 42a may be snugly received over channel 42 formed in face mold 10, as illustrated in FIG. 4. Such difference in dimension may be desirable when exceedingly thick thermoplastic sheets are employed. However, it is intended that normally the cross-sectional dimensions of platen face recesses 34 and 34a be substantially the same. Because of the angularly inclined wall portions 43 of face mold 10 and corresponding angularly inclined face portions 45 (formed by wall portion 36a of die recess 34a) of side wall-defining mold portion 52, a die interlocking engagement is effected between two mold portions in the manner illustrated in FIG. 4.

The undercut recess portions of each mold not only serve to maintain the molds in interlocking relationship, but in addition exert positive pressure urging the inner planar perimetric portions 51 and 53 of the mold parts into tight abutting relationship.

Plaster of Paris or other hardenable composition may then be poured into cavity 65 defined by the nested mold portions 10 and 52 through the central opening 62, more clearly seen in FIG. 4, until the level reaches opening 62. It is seen from FIG. 4 that any liquid level covering the uppermost projection of intagliated mold surface 46 will enable an integral plate to be cast. After the poured composition has hardened, the two mold portions may be readily disengaged by withdrawing locking channel of mold 10 from the channel of mold 52.

It will be seen from FIG. 4 that because of the abutting relationship betwen the annular planar portions 50 and 50a of the mold portions 10 and 52, respectively, there is substantially no penetration of the molding composition from the cavity 65 into the interface between the mold planar annular portions 50 and 50β. The annular planar portions 51 and 53 may be vacuum formed to define a very slight conic whereby optimum intimate contact is insured about the inner edge. It will be further noted from FIG. 4 that even should a slight amount of the plaster composition penetrate between the annular portions, such flash would be disposed behind the outer surface of the cast plate, since outer periphery 48 projects outwardly and forwardly of the underlying annular planar surface portion 50. Thus the visible curved edge would be smooth and free of flash or other parting line defects.

As previously mentioned, a large number of thermoplastic materials, such as butyrates, acetates and polystyrenes, may be employed for forming the novel molds of this invention. A sheet thickness 0.02 inch has been found satisfactory, but other sheet thicknesses may be used, depending upon the applications which the formed molds are to serve. It is desirable that the locking and sealing channels 42 and 42a nest and fit snugly to prevent lifting of mold portion 52 relative to mold portion 10, and also to minimize flash formation. It is preferred that the interlocking channels have a width three times that of the depth to assure the utmost in interlocking efficiency.

It is seen from the foregoing, therefore, that novel, inexpensive thermoplastic molds may be formed by a series of steps including a vacuum-forming operation. Because of the novel interlocking channels and annular planar portions surrounding the effective cavity portions of the mold members, proper relative disposition between the molds and freedom from flash and other flaws is assured. Projecting tab portions 66 and 68 formed integrally with mold portions 10 and 52, respectively, anl including aperture 70, facilitate storage of the mold portions when not in use. The mold portions, either singly or in assembled relationship, may be suspended from a pin, hook or the like. The provision of the inexpensive thermoplastic mold members above described enables the home hobbyist to readily cast plaster articles which heretofore have only been cast my means of more expensive and elaborate apparatus not available to individuals.

It is apparent that many changes may be made in the apparatus and method above described. For instance, the specific configurations of the various mold members and intagliated surfaces thereon may vary considerably. It is also feasible that positive air pressure may be employed rather than vacuum for forcing a thermoplastic sheet against a die surface. Such positive pressure may produce greater forces than those obtainable with the use of vacuum and, accordingly, is deemed advisable when thicker sheet materials are employed for mold-forming purposes.

It is intended that this application be limited only by the scope of the appended claims.

I claim:

1. In a multi-part mold combination composed of mold members having perimetric edge portions adapted to engage in abutting relationship in a cavity-forming position, one of said molds comprising an article face-defining mold, the improvement comprising smooth surface means extending uniformly outwardly from said mold perimetric edges, and locking means formed integrally with said smooth surface means for urging said perimetric edge portions into abutting relationship, the juncture of said perimetric edge portions of said mold members being rearwardly disposed with respect to the outermost periphery of said face-defining mold.

2. In a multi-part mold combination composed of mold members formed of thin deformable material and having perimetric edge portions adapted to engage in opposed cavity-defining relationship, the improvement comprising resilient smooth surface means extending from each of said perimetric edge portions, each of said smooth surface means having a continuous recess formed therein, the widest dimension of said recesses being spaced from the surface of said smooth surface means whereby said recesses are nestably engaged in interlocking relationship when said mold members are in cavity-defining relationship, said smooth surface means being shaped to produce maximum sealing pressure between said surfaces at said perimetric edge portions when said recesses are in interlocking relationship.

3. In a multi-part mold combination composed of mold members formed of thin deformable material and having perimetric edge portions adapted to engage in opposed cavity-defining relationship, the improvement comprising resilient smooth surface means extending from each of said perimetric edge portions, each of said smooth surface means having a continuous recess formed therein, the widest dimension of said recesses being spaced from the surface of said smooth surface means whereby said recesses are nestably engaged in interlocking relationship when said mold members are in cavity-defining relationship, at least one of said smooth surface means having a frusto-conic configuration to resiliently engage the other of said smooth surface means adjacent said perimetric edge portion when said recesses are interlocked.

References Cited by the Examiner

UNITED STATES PATENTS

| 170,839 | 12/1875 | Franz | 18—42 |
|---|---|---|---|
| 671,415 | 4/1901 | Deidrick | 25—129 |
| 1,649,734 | 11/1927 | Roberts et al. | 18—59 |
| 2,354,026 | 7/1944 | Jungersen. | |
| 2,668,987 | 2/1954 | Harris et al. | |
| 2,834,198 | 5/1958 | Goodman. | |
| 3,021,569 | 2/1962 | Lyman. | |
| 3,038,217 | 6/1962 | Harris | 156—91 XR |
| 3,059,279 | 10/1962 | Rossi | 18—34 |
| 3,089,915 | 5/1963 | Plummer | 156—91 XR |

FOREIGN PATENTS

| 391,230 | 4/1933 | Great Britain. |
|---|---|---|
| 856,777 | 12/1960 | Great Britain. |
| 63,839 | 8/1892 | Germany. |

ROBERT F. WHITE, *Primary Examiner.*

MICHAEL V. BRINDISI, ALEXANDER H. BRODMERKEL, *Examiners.*